US012005378B2

(12) United States Patent
Henneberg et al.

(10) Patent No.: US 12,005,378 B2
(45) Date of Patent: Jun. 11, 2024

(54) SYSTEM AND METHOD FOR SEPARATING PARTS OF A LIQUID BASED ON GAS CONTENT

(71) Applicant: C.C. Jensen A/S, Svendborg (DK)

(72) Inventors: Morten Henneberg, Aarup (DK); Anders Damsgaard Serup, Skanderborg (DK); Masood Jaffari, Odense S (DK)

(73) Assignee: C.C. Jensen A/S, Svendborg (DK)

( * ) Notice: Subject to any disclaimer, the term of this patent is extended or adjusted under 35 U.S.C. 154(b) by 432 days.

(21) Appl. No.: 17/284,374

(22) PCT Filed: Oct. 11, 2019

(86) PCT No.: PCT/EP2019/077597
§ 371 (c)(1),
(2) Date: Apr. 9, 2021

(87) PCT Pub. No.: WO2020/074703
PCT Pub. Date: Apr. 16, 2020

(65) Prior Publication Data
US 2021/0339170 A1 Nov. 4, 2021

(30) Foreign Application Priority Data
Oct. 11, 2018 (EP) .................................... 18199874

(51) Int. Cl.
*B01D 19/00* (2006.01)
*F01M 11/03* (2006.01)

(52) U.S. Cl.
CPC ..... *B01D 19/0063* (2013.01); *B01D 19/0068* (2013.01); *B01D 19/0073* (2013.01); *F01M 11/03* (2013.01)

(58) Field of Classification Search
None
See application file for complete search history.

(56) References Cited

U.S. PATENT DOCUMENTS

2012/0137889 A1 6/2012 Iwata et al.
2017/0356838 A1* 12/2017 Knollenberg ........... G01F 1/704
(Continued)

FOREIGN PATENT DOCUMENTS

JP S56-141708 U 10/1981
JP H11-019406 A 1/1999
(Continued)

OTHER PUBLICATIONS

C.C. Jensen A/S. PCT/EP2019/077597, International Filing Date Oct. 11, 2019; International Search Report and Written Opinion, dated Jan. 17, 2020 (13 pages).
(Continued)

*Primary Examiner* — Jason M Greene
(74) *Attorney, Agent, or Firm* — Barclay Damon LLP (57) ABSTRACT

A system and method for separating parts of a liquid based or depending on gas content is disclosed herein. The system, in an embodiment, comprises a pressure chamber, an inlet through which liquid is pumped into said chamber, a first liquid outlet connected to an upper part of said pressure chamber, and a second liquid outlet connected to a lower part of said pressure chamber. The first and second liquid outlets comprise a first valve element and a second valve element, respectively, that are configured to control the pressure inside said pressure chamber. While under pressure, a first subpart of the liquid inside said pressure flows out of the first liquid outlet, and a second subpart of the liquid inside said pressure flows out of the second liquid outlet. The first subpart has a greater percentage of gas content than the percentage of gas content, if any, in the second subpart.

20 Claims, 3 Drawing Sheets

(56) References Cited

U.S. PATENT DOCUMENTS

2018/0111062 A1* 4/2018 Shreve .................. B01D 15/24
2021/0001633 A1* 1/2021 Arnold ...................... B41J 2/18

FOREIGN PATENT DOCUMENTS

| WO | 00/63563 | 10/2000 |
| WO | 2011/018972 A1 | 2/2011 |
| WO | 2017/201451 A1 | 11/2017 |

OTHER PUBLICATIONS

Japan Patent Office, Patent Application No. 2021-519718 Notice of Reasons for Rejection, dated Aug. 15, 2023, 4 pages.

* cited by examiner

SYSTEM AND METHOD FOR SEPARATING PARTS OF A LIQUID BASED ON GAS CONTENT

CROSS-REFERENCE TO RELATED APPLICATIONS

This application is a national stage application pursuant to 35 U.S.C. § 371 of International Application No. PCT/EP2019/077597, filed on Oct. 11, 2019, which claims priority to, and the benefit of, European Patent Application No. 18199874,1, filed on. Oct. 11, 2018. The entire contents of such applications are hereby incorporated by reference.

FIELD OF THE INVENTION

The present invention relates to a system and a method of separating air from liquid. More specifically, the invention relates to a system and a method of separating a liquid into a gas-containing portion and a gas-free portion. Most specifically, the invention relates to a method of separating gas bubbles in oil into a gas-containing portion and a gas-free portion. The invention also relates to a method of measuring gas particle content in liquid.

BACKGROUND OF THE INVENTION

Separating liquids is important in multiple industries, especially where it is crucial that said liquid has the right properties for the further processing, e.g. for use in critical equipment or during measuring procedures. For example, the liquid may comprise constituents not desired in certain equipment or in certain measurement procedures. As such, it is required to be able to separate the liquid, such that such constituents may be separated/minimised from the remaining part of the liquid prior to further processing.

For example, removal of gas/degassing is critical within coolants, where gas deteriorates the heat exchange, lubricants and hydraulics, where gas deteriorates the performance, and engine oil, where gas may affect quality measurements and performance as well as blood (blood samples), where gas deteriorates the quality of measurements and performance, and carbonated beverages where gas needs to be removed prior to addition of carbon dioxide and water, and where gas may be undesired for certain uses, e.g. in boilers and sensitive laboratory equipment.

Within the field of engines, it is desired to monitor the condition of the oil. Especially, it is desired to monitor the amount of particles in the oil, e.g. wear particles. However, the presence of gas bubbles in the oil, which may arise due to multiple circumstances in the engine, may disrupt the reading, despite such gas bubbles not affecting the quality of the oil in such a context. Therefore, there is a need to separate or minimise the amount of gas bubbles in the oil prior to the particle measurement. In other cases, the gas bubbles may indeed affect the quality of the oil and functioning of subsequent processing, and as such, it is a requirement to remove/minimise such gas bubbles in the oil.

Prior art suggests minimising the amount of gas bubbles in oil by means of applying pressure to the oil, whereby the gas bubbles are minimised/reduced in size, and thereby do not cause a problem or disrupt measurements. According to such methods, oil is pressurised by means of a pump arranged between a reservoir and a channel in which the oil experiences a pressure build-up. Due to the pressure build-up, gas bubbles within the oil is minimised to such a degree that they do not affect the readings of subsequent measuring procedures. Thus, measuring equipment would be arranged downstream the channel. However, the method possesses several problems. First, the gas bubbles present in the liquid are not removed per se, but rather minimised to a certain extent, where the reduction in size is determined by the applied pressure in the channel downstream the pump. Secondly, due to said bubbles not being removed per se, it is not possible to use the gas-free oil at a later stage if one were to request such oil.

According to other pieces of prior art, reducing the amount of gas bubbles present in a liquid may be by means of gravity/buoyancy, where gas bubbles will escape the liquid by time as the liquid is heavier than the gas in most common cases. However, such methods are cumbersome and time-consuming, and as such not desired within certain technical fields.

GENERAL DESCRIPTION

The object of the invention is to solve some of the above-mentioned problems. According to the invention, a system for separating gas from a liquid is proposed. The system comprises a pressure chamber, said pressure chamber comprising an inlet through which liquid is pumped into said chamber, and wherein said pressure chamber further comprises a first liquid outlet connected to an upper part of said pressure chamber comprising a first valve element and a second liquid outlet connected to a lower part of said pressure chamber comprising a second valve element. Said first and second valve elements are adapted to control the pressure inside said pressure chamber, whereby, while under pressure, a subpart of the liquid inside said pressure flows out of the first and second liquid outlets, respectively, and wherein a main part of the gas content is in the subpart flowing through the first liquid outlet.

By a system for separating gas from a liquid may be meant a system capable of separating a first subpart of the liquid comprising a majority/main part of the gas from a second subpart being essentially gas-free or containing only a minority part of the gas following the separation procedure. In most cases, the gas is air, i.e. atmospheric air, but may be other types of gas formed during different processes of a system as well.

By a pressure chamber is meant a chamber being capable of holding a certain pressure above the ambient pressure surrounding the chamber and building a pressure within the chamber in certain embodiments as well. For example, the pressure chamber may be capable of holding a pressure between 1 bar and 50 bar. The pressure chamber may be considered a container. Thus, the pressure chamber may comprise four walls, and a top and a bottom being orthogonal thereto. However, the chamber may also take different geometries, as such a cylindrical chamber with only a single curved side-wall and a top and a bottom being orthogonal thereto would also be an embodiment of the invention. The internal volume of the pressure chamber may be adapted to fit the purpose of the system, i.e. the amount of liquid that needs to be separated in a given time span. By an inlet through which liquid is pumped into the pressure chamber is meant an inlet in communication with a liquid reservoir, i.e. a reservoir wherein gas becomes dissolved or mixed with liquid, or where the liquid with gas is contained prior to being pressurised within the pressure chamber. For example, the liquid reservoir may be an engine, liquid container, boiler, coolant container, etc. The inlet may be provided with a pump, such that the pressurisation takes place by the inlet, or a pump may be provided upstream the inlet, i.e. between the liquid reservoir and the inlet. In other embodiments of the invention, no pump is provided, and the pressure is built earlier in the system or provided through the processes which the liquid undergoes prior to separation of gas taking place within the system.

By a first liquid outlet connected to an upper part of the pressure chamber is meant that the first liquid outlet is arranged in an upper position relative to a second liquid outlet connected to a lower part of the pressure chamber, where the second outlet is arranged below the first outlet relative to gravity, i.e. an object, e.g. liquid, tends to fall in a direction from the first outlet towards the second outlet. The relative positions are true in an operating procedure, i.e. where the system is running, i.e. separating liquid.

The first liquid outlet comprises a first valve element, and the second liquid outlet comprises a second valve element. The valve elements are adapted to control the pressure inside the pressure chamber. Throughout this documents, valve elements refer to all types of elements limiting the flow through the first an second outlets, whereby the inlet flow in combination with the outlet flow provides a pressure inside the pressure chamber. Valve elements could be active valve elements or passive valve elements. Passive valve elements are statically valves allowing a specific flow through the outlets and only by using a different static valve at the outlet, a different flow can be obtained. Examples of static valves could e.g. be by having limited outlet or downscaled outlet opening, orifice, or it could be a static spring-based valve. Active valve elements are valves where the valve can be adjusted functionality either by mechanical lever or by an electronic control system either positioned on the valve or via a communication unit. Passive valve elements could advantageously be used in situations, where the system is being used for liquid having static properties and therefore, the first and second outlet flows do not need be adjusted during use.

In a specific embodiment, the flow from the first liquid outlet at the upper part of the pressure chamber could be ⅓ of the total flow out of the chamber, and the flow from the second outlet at the lower part of the pressure chamber would then be ⅔ of the total outlet flow. In another embodiment, the flow from the first liquid outlet at the upper part of the pressure chamber could be 40% of the total flow out of the chamber, and the flow from the second outlet at the lower part of the pressure chamber would then be 60% of the total outlet flow.

The valve element could also be active valve elements, which can be operated, and thereby the outflow is adjustable. By operating the valve elements, i.e. opening/closing the valves, the pressure may be built up or relieved. Preferably, the valves may be opened/closed gradually, thereby facilitating a higher degree of control. Thereby, when closed, a pressure may build up within the pressure chamber if liquid is supplied from the liquid reservoir through the inlet. The valves may be opened during operation for allowing liquid to escape the pressure chamber. Depending on the configuration of the system, the over-pressure created within the pressure chamber may be maintained downstream the pressure chamber, or the pressure may be equalised with the surroundings, e.g. with the liquid reservoir.

Due to the liquid being pressurised within the pressure chamber, said liquid will separate into two subparts; a first subpart will escape the pressure chamber through the first liquid outlet, and a second subpart will escape the pressure chamber through the second liquid outlet. According to the invention, and due to the pressurised nature of the liquid, i.e. the liquid is subjected to a higher pressure within the chamber than before entering the chamber, a main part of the gas content in the liquid is contained in the first subpart escaping through the first liquid outlet. Especially, due to the presence of gas in the liquid, the first subpart of the separated liquid holding said gas will have a density being less than the density of the second subpart of the separated liquid being essentially gas-free. Thus, due to gravity, the first subpart will rise relative to the heavier second subpart.

Thereby, liquid having a certain gas content wilt be separated into two subparts in a fast and easy way, where the first subpart comprises a main part of the gas content and the second subpart comprises liquid being essentially free of gas. The pressurisation within the pressure chamber decreases the time it takes to achieve such separation. Further, the provision of valves and outlet allows controlling the separation process and further allows the outlet of a liquid having a main part of the gas content and the outlet of liquid being essentially gas-free. Further, the provision of valves allows a continuous process, such that the system may be incorporated into running processes, e.g. a running engine.

The pressure inside the chamber facilitating the above separation inside the pressure chamber depends on the liquid to be separated and could be between 1 bar and 50 bar.

Additionally, an increase of pressure also increases the solubility of gas in the liquid. This means that small bubbles present in the liquid would be incorporated into the oil rather than stay bubbles, i.e. local pockets of gas within the liquid. Once the elements in the gas are incorporated into the liquid, they no longer cause false positives in measurement equipment as they are not distinguished from the remaining liquid and thus do not resemble particles. This contributes to small bubbles disappearing and the subpart of the liquid with a minority of gas containing even less gas, or that the essentially gas-free subpart becomes a larger portion relative to the subpart containing the majority of gas.

Further, since the target of the separation process is not to degas the liquid, but rather to split the liquid into two subparts, one of which comprises a main part of the gas, the process may run faster than conventional processes. Thus, the output of the separation process is two subparts of the initial gas-containing liquid. Thereby, the two subparts may be treated differently. For example, the gas-free liquid may undergo certain measurements or treatments, whereas the liquid holding the main part of the gas content may be neglected during measurement/treatment and subsequently mixed with the gas-free liquid or disposed completely. The liquid containing gas is no less clean than the essentially gas-free subpart, it simply has more pockets of gas dispersed within it. Hence, it may be used in a system where it is not a problem that the liquid contains bubbles. The invention may be used in systems, where the two subparts of the liquid are used separately for more than measurements of the conditions of the liquid before they are combined again. In other embodiments, the two subparts of the liquid will be combined once the measurements have been made. In yet other embodiments, the two subparts of the liquid will not be combined at any point after having been separated within the described system.

In an embodiment, the first and second valve elements ensure a pressure inside said pressure chamber between 1 and 50 bar. By having such a pressure, the gas content separates effectively.

In an embodiment, the total flow from said first and second liquid outlets is 100%, and wherein the first valve element ensures a liquid flow through said first liquid outlet below 50%, preferably below 40% and more preferably below 33%. Tests have shown that the liquid with gas content at the upper part of the pressure chamber will flow through the first liquid outlet.

In an embodiment, the first and second valve elements are passive valves. Thereby, a system is obtained which is predesigned for a specific use, and maintenance of the system is not as necessary.

In an embodiment, the passive valve element positioned at the upper first outlet is a downscaled outlet opening, and the passive valve element positioned at the lower second outlet is a static spring-based valve. This has proven to be a specifically good setup when using the system for removing gas from a liquid being oil.

In an embodiment, the system further comprises measurement equipment for measuring properties of the liquid, and wherein said measurement equipment is positioned at the second liquid outlet. Thereby, the measurement equipment measures liquid with no or no significant gas content, thereby ensuring a more correct measurement.

In an embodiment said, second valve element is positioned after said measurement equipment. This ensures that the pressure is not obtained until after a measurement, thereby avoiding the risk of gas being reintroduced before the measurement.

In an embodiment, liquid from the first liquid outlet and the liquid from the second liquid outlet are combined in the junction after having passed said measurement equipment. Then all liquid can be mixed again and used for its purpose.

In an embodiment, said liquid is pumped into the chamber at the upper part of said pressure chamber. Tests have proven that liquid in the chamber can thereby be effectively split into an upper part with gas and a lower part without gas.

In an embodiment, said pressure chamber is shaped as an elongated cylinder and in an embodiment, a filter is positioned at said inlet of said chamber.

The invention further relates to a method of separating gas from a liquid and more specifically a method of measuring particle content in a liquid, wherein the measurement is performed on liquid from which gas have been separated.

SHORT LIST OF THE DRAWINGS

In the following, example embodiments are described according to the invention, where.

DETAILED DESCRIPTION OF DRAWINGS

In the following, the invention is described in detail through embodiments thereof that should not be thought of as limiting to the scope of the invention.

Figure 1A:
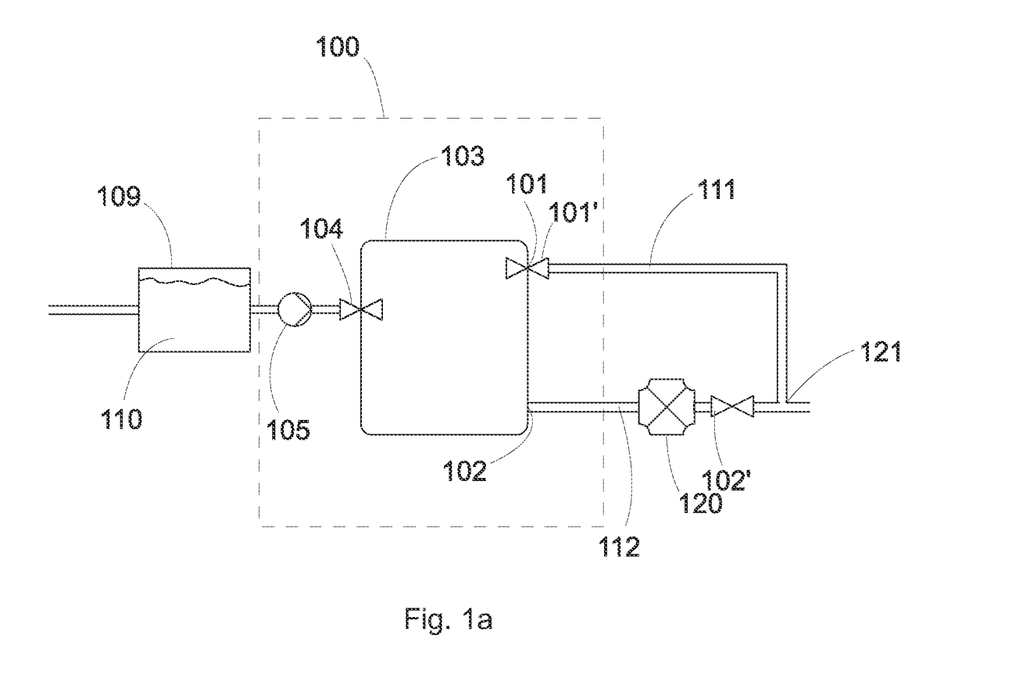
FIG. 1a illustrates a system according to the invention in connection with a measurement setup for measuring the properties of the liquid.
Figure 1B:
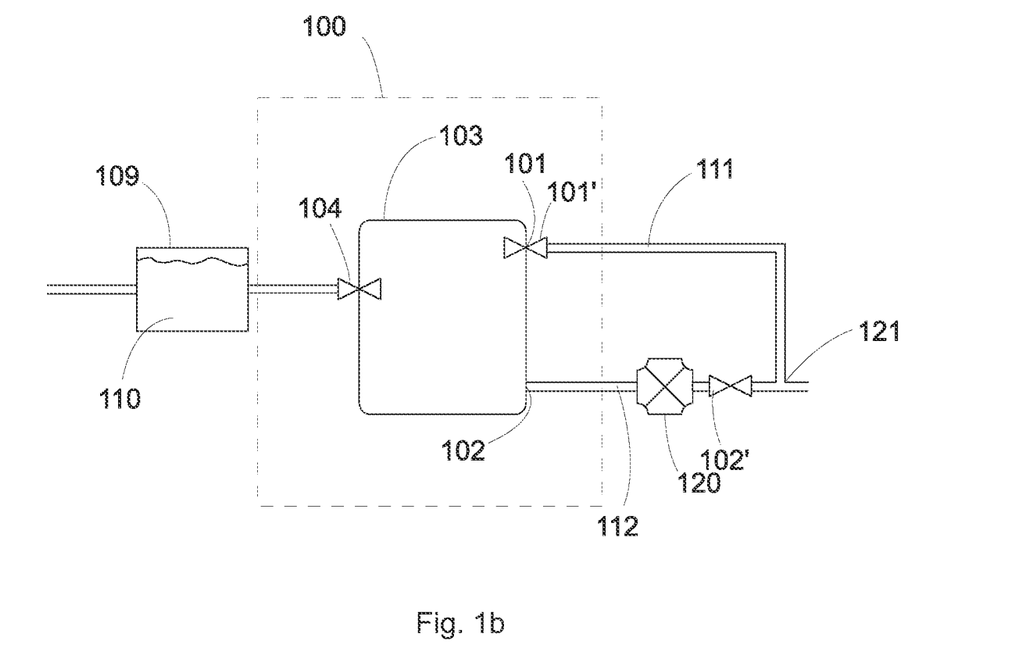
FIG. 1b illustrates an embodiment of a system according to the invention in connection with a measurement setup for measuring the properties of the liquid.

FIG. 1a and FIG. 1b illustrate a system 100 for carrying out a method of separating a liquid 110 into two subparts 111,112. The system 100 comprises a pressure chamber 103, wherein a liquid 110 at an elevated pressure may be contained or wherein the pressure of the liquid 110 may be built up. The chamber 103 has an inlet 104 and two outlets; 101, 102. The inlet 104 receives liquid 110 from a liquid reservoir 109, e.g. an engine in case the liquid is oil and the oil is part of the lubrication system of an engine. The liquid reservoir 109 may be a filter as well through which the liquid passes. In any case, the liquid reservoir 109 may be anything from which a supply of liquid is facilitated.

In the embodiment illustrated in FIG. 1a upstream the inlet 104, i.e. prior to entering the pressure chamber 103, a pump 105 is arranged. The pump 105 may likewise be arranged at the inlet 104. The pump 105 applies a pressure to the liquid 110, such that said liquid 110 is pressurised within the pressure chamber 103, i.e. the pressure is elevated compared to the pressure in the reservoir 109. The pumping speed of the pump 105 may be controlled, such that the pressure within the pressure chamber 103 may be controlled, e.g. increasing the speed of the pump 105 will increase the pressure on the liquid within the pressure chamber 103. The pressure chamber 103 may be considered a container having delimiting walls. The pressure chamber 103 may take any appropriate shape.

In the embodiment of the system 100 illustrated in FIG. 1b, no pump is present upstream of the inlet 104. In this embodiment of the system 100, the flow of liquid 110 into the pressure chamber 103 arises from conditions external to the system 100. For example, the reservoir 109 may be a motor, and the flow of oil in that motor may lead oil into the pressure chamber 103 through inlet 104. Alternatively, the flow of liquid 110 into the pressure chamber 103 arises from an increase of liquid in the reservoir 110. In yet another context for the system, one or more pumps are placed before the disclosed system driving a flow of the liquid 110 into the pressure chamber 103 through the inlet 104. The flow of liquid into the pressure chamber 103 may also arise from natural forces such as gravity. Pressure will build inside the pressure chamber 103 and ensure the division of the liquid 110 into the two subparts 111 and 112 regardless of the cause of the flow of liquid through the inlet 104 into the pressure chamber 103.

The pressure chamber 103 comprises two outlets and two valves; a first outlet 101 provided with a first valve 101' and a second outlet 102 provided with a second valve 102'. The first outlet 101 is arranged in an upper part of the pressure chamber 103, and the second outlet 102 is arranged in a lower part of the pressure chamber 103. The terms "upper" and "lower" here refer to their relative orientation and their orientation relative to gravity. Thus, an object would tend to fall in a direction from the upper part towards the lower part. The object in the present case is the liquid 110, such that gas (not shown) would tend to rise towards the upper part due to its buoyancy/density within such liquid 110 and as such towards the first outlet 101. Likewise, the liquid 110 would tend to fall towards the lower part and as such towards the second outlet 102.

The provision of valves 101', 102' allows controlling the pressure within the pressure chamber 103 while at the same time allowing a continuous flow of the liquid through the system 100. Thereby, the liquid 110 may be separated in a continuous process, such that the system 100 may be incorporated into running equipment, e.g. a running engine.

Throughout this documents, valve elements refer to all types of elements limiting the flow through the first an second outlets, whereby the inlet flow in combination with the outlet flow provide a pressure inside the pressure chamber. Valve elements could be active valve elements or passive valve elements. Passive valve elements are statically valves allowing a specific flow through the outlets and only by using a different static valve at the outlet, a different flow can be obtained. Examples of static valves could e.g. be by having limited outlet or downscaled outlet opening, orifice, or it could be a static spring-based valve. Active valve element are valves, where the valve functionality can be adjusted either by mechanical lever or by an electronic control system either positioned on the valve or via a communication unit. Passive valve elements could advantageously be used in situations, where the system is being used for liquid having static properties and therefore, the first and second outlet flows do not need be adjusted during use.

In an embodiment, the valve elements positioned at both the first and second outlets are passive valve elements. More specifically, the passive valve element positioned at the upper first outlet is a downscaled outlet opening, and the passive valve element positioned at the lower second outlet is a static spring-based valve.

Due to the liquid 110 being pressurised within the pressure chamber 103, the tendency of the gas bubbles to rise and liquid to fall is accelerated. Thereby, a phase change occurs: in the upper part of the pressure chamber 103, a first subpart 111 of the liquid 110 develops, whereas in the tower part of the pressure chamber, a second subpart 112 of the liquid 110 develops. The first subpart 111 is characterised by comprising a main part of the gas contained in the liquid 110 prior to the separation, whereas the second subpart 112 of the liquid 110 is characterised by comprising liquid without gas or with significantly reduced amounts of gas. For these reasons, the first subpart 111 has a lower density (due to the higher content of gas) than the second subpart 112. Furthermore, the increased pressure within the pressure chamber 103 will lead to an overall decrease in the amount of gas bubbles in the liquid as more of the gas can be dissolved in the liquid at higher pressures, e.g. the elements of the gas, e.g. Nitrogen and Oxygen, become part of the liquid solution while the pockets of the elements still in a gaseous phase decrease. The smaller bubbles of the gas are so to speak worked into the liquid when subjected to an increased pressure.

Thus, it is noted that the separation of the liquid 110 in a system 100 according to the invention does not target extracting the gas from the liquid 110 (degassing), but rather containing a main part of the gas in a first subpart 111 of the liquid 100, such that the second subpart 112 is essentially free of gas. The volume of each of the subparts 111,112 may be controlled by controlling the pressure within the pressure chamber 103.

Subsequent to the separation, the first subpart 111 and the second subpart 112 may pass through different procedures. For example, in certain embodiments, the second subpart 112 may pass through measurement equipment 120, whereas the first subpart 111 is unmeasured due to its high content of gas, which may be undesired in such measurement equipment 120. Thereby, the liquid 110 may be assessed as if no gas were present, as such gas is contained in the first subpart 111. As the two subparts of the liquid 111, 112 are equally clean or dirty, as the only difference is the amount of bubbles present, a measurement of only the second subpart 112 will give a reliable assessment of the quality of the overall state of the liquid in the system 100.

The two subparts of the liquid 111,112 may undergo further procedures while divided, e.g. if there is equipment which is sensitive to bubbles but which needs the liquid, e.g. as a lubricant or to avoid the presence of gas. It is also possible to have the first 111 and second subpart of the liquid 112 be combined after measurements are performed on the second subpart 112 before the combined liquid is used in any further processing. In yet other uses, the first subpart 111 may be discarded all together if equipment downstream of the system 100 is sensitive to the presence of gas bubbles.

In certain situations, the presence of gas in the liquid reservoir 109 may be unimportant, but it may be important to measure the state/quality of the liquid 110 without the presence of gas Such a situation may be found in engines, where the liquid 110 is oil: the presence of gas in the oil is not necessarily damaging to the functioning of the engine, but the gas may be confused as being particles by the measurement equipment 120, which may indeed be damaging as it would lead to erroneous assessment of the status of the liquid 110. Thus, it is a requirement to be able to separate the gas from the oil prior to such measurement procedures. The supplied oil may have passed through a particle filter, and the separation system 100 thereby allows evaluating the quality of said filter by measuring the amount of particles— without the risk of having gas bubbles interfering with the measurement equipment 120. In the embodiment illustrated in FIG. 1a and FIG. 1b, where the measurement equipment is also present, the valve 102' at the second outlet is positioned after the measurement equipment to ensure that pressure is maintained during measurement and thereby, air cannot be introduced until after the measurement equipment ensuring a precise measurement. Due to the provision of valves 101', 102', the system 100 may be incorporated into a running engine and thereby allowing a continuous separation and thereby evaluation of the state of the oil/liquid 110. Following the measurement procedure, the two subparts 111,112 may be mixed at the junction 121 prior to flowing into the liquid reservoir 109 again. By this process, all air may not be removed before the measurement equipment, but at least it is ensured that a significant part of the air is removed, whereby the air is not measured by the measurement equipment e.g. as particles, or at least the impact of air is decreased, as there will not be a significant amount of bubbles to disturb the measurement significantly.

In other situations, it may be desired to dispose of the first subpart 111, such that only the second subpart 112 is processed further. For example, this may be relevant in water boilers, where the presence of gas is undesired, or carbonated beverages, where the presence of gas prior to addition of carbon dioxide is undesired. In such a situation, it may be desired to reduce the volume of the first subpart 111 as much as possible to avoid a large waste of resources. Due to the configuration of the system 100 according to the invention, the volume of the subparts may be controlled by means of the pressure within the pressure chamber 103 through the valves 101', 102', and the pumping speed of the pump 105. Having reduced the volume of the first subpart 111 containing a main part of the gas, it is possible to dispose of said subpart without a large amount of waste, while at the same time running the process continuously, such that the essentially gas-free second subpart 112 may be treated further, e.g. addition of carbon dioxide to a beverage or circulating the gas-free water in a water boiler.

Figure 2:
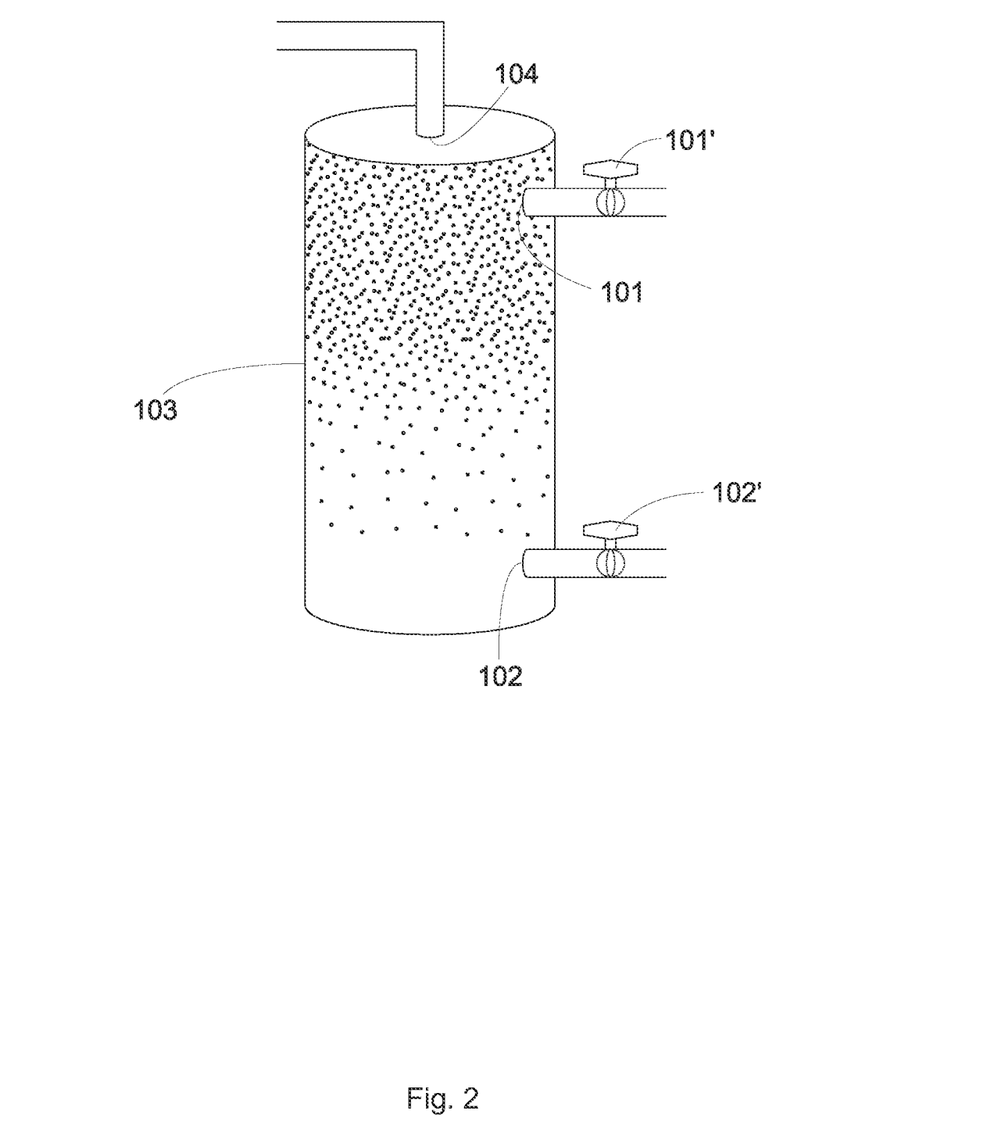
FIG. 2 illustrates an example of the components of the system.

FIG. 2 illustrates an example of the components of the system, where a pressure chamber 103 is illustrated as a cylindrical container. For illustrative purposes, the walls of the container is transparent. The container could e.g. be made from metal such as steel or any other material suitable for a pressure container. In the illustration, the container is shaped as a cylinder, but other shapes could also be chosen. Basically, the chamber needs to be able to obtain a pressure and to be connected to two outlets 101, 102 and at least a single inlet 104. In the illustration, a liquid inlet 104 is positioned at the top of the container and liquid can be pumped into the container via the inlet. In other embodiments, the liquid inlet could be positioned at alternative positions, e.g. to the side of the container 103. Means for pumping liquid into the pressure chamber could be positioned in connection with the actual liquid inlet 104, but also somewhere before the inlet thereby making it possible to move liquid into the pressure chamber. In some embodiments the system will not comprise means for pumping liquid into the pressure chamber 103. In such embodiments, the flow of liquid through the liquid inlet 104 will be supplied by external means, e.g. by using gravity, as long as a pressure is build inside the pressure chamber 103.

The liquid outlets 101 and 102 are both equipped with valves 101' and 102', and these valves can be controlled individually. The valves could be positioned in connection to the outlets of the pressure chamber, but they could also be positioned at a different position away from the outlets of the chamber, as long as they can be used for controlling the pressure inside the chamber by a combined control of the inlet and the outlet flow. As can be seen on the figure, due to the walls being transparent for illustration purposes, liquid is illustrated inside the container and the air content/ air bubbles are illustrated as black dots in the liquid. In the illustration, there is a pressure inside the pressure chamber 103 and due to this pressure and the settings of the first and second valves 101', 102', the air content rises to the upper part of the pressure chamber near the first outlet 101. Thereby, air content of the liquid positioned at the lower part of the pressure chamber near the second outlet 102 is reduced.

In a specific embodiment, the flow from the first liquid outlet at the upper part of the pressure chamber could be ⅓ of the total flow out of the chamber, and the flow from the second outlet at the lower part of the pressure chamber would then be ⅔ of the total outlet flow. In another embodiment, the flow from the first liquid outlet at the upper part of the pressure chamber could be 40% of the total flow out of the chamber, and the flow from the second outlet at the lower part of the pressure chamber would then be 60% of the total outlet flow. In another embodiment, the flow from the first liquid outlet at the upper part of the pressure chamber could be 20-30% of the total flow out of the chamber, and the flow from the second outlet at the lower part of the pressure chamber would then be 70-80% of the total outlet flow.

Figure 3:
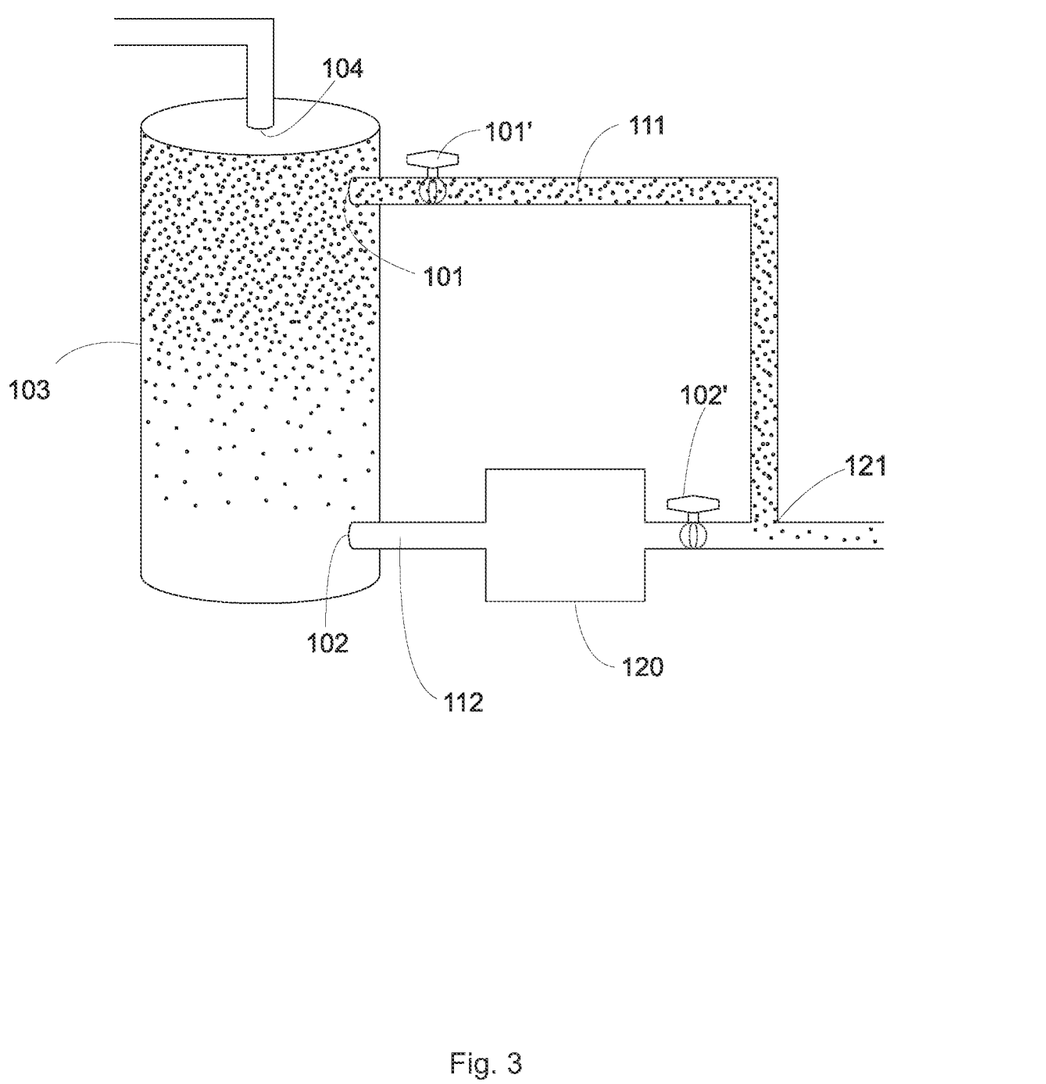
FIG. 3 illustrates the components as illustrated in FIG. 2 together with a measurement setup.

FIG. 3 illustrates the components as illustrated in FIG. 2 together with a measurement setup according to a specific embodiment of the present invention. The first subpart of liquid 111 is led out through the first outlet 101 and via the first valve 101', whereas the second subpart of liquid with reduced air content is led through the second outlet 102 via the second valve 102'. In the illustrated embodiment, where the measurement equipment is also present, the valve 102' at the second outlet is positioned after the measurement equipment to ensure pressure is maintained during measurement and thereby, air cannot be introduced until after the measurement equipment thus ensuring a precise measurement. The second subpart of liquid 112 is then led through the measurement equipment e.g. for measuring the particle content in the liquid. After the measurement, the first and second subparts of liquid are combined in the junction 121 and led on to be used for its purpose. The fact that the measurement equipment measures liquid with reduced air content ensures that there is a reduced risk of faulty measurements due to air content.

REFERENCE NUMBERS

100 System for separating gas from a Liquid 110
101 First outlet
101' First valve
102 Second outlet
102' Second valve
103 Pressure chamber
104 Inlet
105 Pump
109 Liquid reservoir
110 Liquid
111 First subpart of Liquid 110
112 Second subpart of Liquid 110
120 Measurement equipment
121 Junction

The invention claimed is:

1. A system for separating parts of a liquid depending on gas content,
the system comprising:
a pressure chamber;
an inlet configured to receive a liquid that is pumped into said pressure chamber, wherein the liquid comprises a gas content;
a first liquid outlet connected to an upper part of said pressure chamber, the first liquid outlet comprising a first valve element; and
a second liquid outlet connected to a lower part of said pressure chamber, the second liquid outlet comprising a second valve element,
wherein said first and second valve elements are configured to enable control of a pressure inside said pressure chamber, whereby, while under the pressure, the first liquid outlet is configured to output a first subpart of the liquid, and the second liquid outlet is configured to output a second subpart of the liquid, and
wherein the first subpart comprises a greater percentage of the gas content than any percentage of the gas content in the second subpart.

2. The system of claim 1, wherein the first and second valve elements are configured to maintain a pressure inside said pressure chamber between 1 and 50 bar.

3. The system of claim 1, wherein a sum of the first subpart of the liquid from said first outlet and the second subpart of the liquid from said second liquid outlet total 100%, wherein the first valve element limits the first subpart of the liquid from said first liquid outlet, and wherein the first subpart of the liquid comprises one of: (a) an amount that is less than 50% of the sum, (b) an amount that is less than 40% of the sum, or (c) an amount that is less than 33% of the sum.

4. The system of claim 1, wherein the second valve element comprises a static spring-based valve.

5. The system of claim 1 further comprising a measurement equipment configured to measure properties of the liquid, and wherein said measurement equipment is positioned at the second liquid outlet.

6. The system of claim 5, wherein said second valve element is positioned after said measurement equipment.

7. The system of claim 5 further comprising a junction positioned downstream from said measurement equipment and configured to combine the liquid from the first and second liquid outlets.

8. The system of claim 1 further comprising a pump configured to pump said liquid into the upper part of said pressure chamber.

9. The system of claim 1, wherein said pressure chamber is shaped as an elongated cylinder.

10. The system of claim 1, wherein a filter is positioned at said inlet, which is connected to the pressure chamber.

11. A method of separating parts of a liquid based on gas content, the method comprising:

providing a pressure chamber configured to receive a liquid that is pumped into the pressure chamber, wherein the liquid comprises a gas content, and wherein said pressure chamber comprises:
a first liquid outlet connected to an upper part of said pressure chamber, the first liquid outlet comprising a first valve element; and
a second liquid outlet connected to a lower part of said pressure chamber, the second liquid outlet comprising a second valve element,
wherein said first and second valve elements are configured to control a pressure inside said pressure chamber, whereby, while under the pressure, a first subpart and a second subpart of the liquid inside said pressure chamber flow out of the first and second liquid outlets respectively,
wherein the first subpart comprises a first amount of the gas content, the first amount being one of: (a) a portion of the gas content; or (b) all of the gas content,
wherein any of the gas content in the second subpart comprises a second amount that is less than the first amount.

12. The method of claim 11, wherein the pressure chamber further comprises a measuring equipment configured to measure a particle content of liquid from the second liquid outlet.

13. The method of claim 12, wherein the first and second liquid outlets are configured to combine liquid from said second liquid outlet downstream of the measurement equipment with the liquid from said first liquid outlet.

14. The method of claim 12, wherein the liquid is oil.

15. A system operable to separate parts of a fluid, the system comprising:
a pressure chamber comprising:
  a first part defining an inlet;
  a second part defining a first outlet; and
  a third part located below the second part when the pressure chamber is vertically oriented, wherein the third part defines a second outlet;
a first channel in fluid communication with the first outlet;
a first valve positioned at least partially within the first channel;
a second channel in fluid communication with the second outlet; and
a second valve positioned at least partially within the second channel,
wherein the pressure chamber is configured to receive a fluid that is pumped into the inlet, wherein the fluid comprises a liquid content and a gas content,
wherein the first and second values are configured to control a designated pressure inside the pressure chamber,
wherein the first outlet is configured to output a first fluid part of the received fluid,
wherein the second outlet is configured to output a second fluid part of the received fluid,
wherein the first fluid part comprises a first amount of the gas content, wherein the first amount comprises one of: (a) a portion of the gas content; or (b) all of the gas content,
wherein, due at least partially to the designated pressure, any of the gas content in the second fluid part comprises a second amount that is less than the first amount.

16. The system of claim 15, wherein:
the pressure chamber comprises an elongated shape;
the system comprises a junction that fluidly connects the first channel to the second channel; and
the junction is configured to distribute a combination of the first and second fluid parts for a desired use.

17. The system of claim 15, wherein:
the first value is located downstream from the first outlet;
the second value is located downstream from the second outlet; and
the second valve comprises a static spring-based valve.

18. The system of claim 15, wherein the liquid content comprises oil.

19. The system of claim 15, comprising a measurement device that is in fluid communication with the second channel.

20. The system of claim 19, wherein:
the measurement device is configured to provide information related to the second amount of any of the gas content in the second fluid part; and
the pressure chamber comprises an elongated shape.

* * * * *